US009509811B2

(12) United States Patent
Merino Vazquez et al.

(10) Patent No.: US 9,509,811 B2
(45) Date of Patent: Nov. 29, 2016

(54) METHODS AND APPARATUS FOR RESOLVING DATA INCONSISTENCIES IN AN IMS NETWORK

(71) Applicant: Telefonaktiebolaget L M Ericsson (publ), Stockholm (SE)

(72) Inventors: Emiliano Merino Vazquez, Madrid (ES); Tobias Austrell, Älvsjö (SE); Francisca Bejarano Garcia, Madrid (ES); David Heras Cano, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 49 days.

(21) Appl. No.: 14/649,420

(22) PCT Filed: Dec. 28, 2012

(86) PCT No.: PCT/EP2012/077057
§ 371 (c)(1),
(2) Date: Jun. 3, 2015

(87) PCT Pub. No.: WO2014/101953
PCT Pub. Date: Jul. 3, 2014

(65) Prior Publication Data
US 2015/0312387 A1  Oct. 29, 2015

(51) Int. Cl.
*H04L 29/14* (2006.01)
*H04L 29/06* (2006.01)

(52) U.S. Cl.
CPC ............ *H04L 69/40* (2013.01); *H04L 65/1016* (2013.01); *H04L 65/1046* (2013.01); *H04L 65/1073* (2013.01)

(58) Field of Classification Search
None
See application file for complete search history.

(56) References Cited

U.S. PATENT DOCUMENTS

| 2009/0119404 A1 | 5/2009 | Kaura et al. |
| 2009/0279425 A1* | 11/2009 | Du .......................... H04L 69/40 370/216 |

(Continued)

FOREIGN PATENT DOCUMENTS

| EP | 1 914 937 A1 | 4/2008 |
| WO | 2010142177 A1 | 12/2010 |

OTHER PUBLICATIONS

International Search Report and Written Opinion dated Aug. 29, 2013 for International Application Serial No. PCT/EP2012/077057, International Filing Date—Dec. 28, 2012 consisting of 14-pages.

(Continued)

*Primary Examiner* — Hassan Phillips
*Assistant Examiner* — Gautam Sharma
(74) *Attorney, Agent, or Firm* — Christopher & Weisberg, P.A.

(57) ABSTRACT

A Serving Call Session Control Function, S-CSCF, within an IP Multimedia Subsystem, IMS, core network. Notifications are sent to a Home Subscriber Server, HSS, of the IMS core network, indicating IMS registration state changes of users. Delivery failure of a notification of an IMS registration state change sent to a HSS and relating to a given user is detected. An association between an identifier of the given user and an indication of said delivery failure is stored in order to indicate a loss of IMS registration state synchronization for the given user between the S-CSCF and the HSS. An event requiring an IMS registration state change for the user is detected. A determination is made that a delivery failure indication associated with the user's identifier is stored. The HSS is notified indicating the required IMS registration state change and of a previous loss of the IMS registration state synchronization.

20 Claims, 4 Drawing Sheets

(56) References Cited

U.S. PATENT DOCUMENTS

2010/0229027 A1 9/2010 Belinchon et al.
2011/0213896 A1* 9/2011 Merino
 Vazquez ........... H04L 29/12188
 709/245
2014/0045490 A1* 2/2014 Phan-Anh ............. H04W 24/04
 455/424

OTHER PUBLICATIONS

3GPP TS 23.002 V12.0.0 (Sep. 2012) 3rd Generation Partnership Project; Technical Specification Group Services and System Aspects; Network Architecture (Release 12) Sep. 14, 2012 consisting of 105-pages.

3GPP TS 23.228 V11.6.0 (Sep. 2012) 3rd Generation Partnership Project; Technical Specification Group Services and System Aspects; IP Multimedia Subsystem (IMS); Stage 2 (Release 11) Sep. 14, 2012 consisting of 290-pages.

3GPP TS 24.229 V11.5.0 (Sep. 2012) 3rd Generation Partnership Project; Technical Specification Group Core Network and Terminals; IP multimedia call control protocol based on Session Initiation Protocol (SIP) and Session Description Protocol (SDP); Stage 3 (Release 11) Sep. 21, 2012 consisting of 766-pages.

3GPP TS 23.380 V11.0.0 (Sep. 2012) 3rd Generation Partnership Project; Technical Specification Group Core Network and Terminals; IMS Restoration Procedures (Release 11) Sep. 28, 2012 consisting of 17-pages.

3GPP TS 29.228 V11.5.1 (Nov. 2012) 3rd Generation Partnership Project; Technical Specification Group Core Network and Terminals; IP Multimedia (IM) Subsystem Cx and Dx interfaces; Signalling flows and message contents (Release 11) Nov. 15, 2012 consisting of 73-pages.

* cited by examiner

METHODS AND APPARATUS FOR RESOLVING DATA INCONSISTENCIES IN AN IMS NETWORK

TECHNICAL FIELD

The present invention relates to methods and apparatus for resolving data inconsistencies within an IP Multimedia Subsystem network, and in particular for handling data inconsistencies arising between a Serving Call Session Control Function and a Home Subscriber Server due, for example, to a link failure.

BACKGROUND

IP Multimedia Subsystem (IMS) is the technology defined by the Third Generation Partnership Project (3GPP) to provide IP Multimedia services over mobile communication networks. The architecture and general features of the IMS are described generally in 3GPP specification TS 23.002 and, in more detail, in TS 23.228. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. Other protocols are used for media transmission and control, such as Real-time Transport Protocol and Real-time Transport Control Protocol (RTP/RTCP).

The IMS is logically structured into a so-called "core network" layer (implemented by functional entities which are briefly described below), and a so-called "service layer" (essentially comprising "application servers" arranged to provide services to user terminals (referred to hereinafter as User Equipment (UE)) connected via the IMS, and/or arranged to mediate in the provision of services by executing specific service-based logic, such as to divert an incoming multimedia session in certain circumstances).

Of particular interest here are the Serving Call Session Control Function (S-CSCF) and the Home Subscriber Server (HSS) which are both present within the IMS core network. The S-CSCF performs the session control services for a UE and maintains a session state according to the (SIP) signalling exchanged with a UE for supporting the services originated and/or terminated by the UE. The S-CSCF can also communicate with "application server/s" of the IMS "service layer" to handle a service for an UE. Further details of the functionality of a S-CSCF are given in chapter 4.6.3 of 3GPP specification TS 23.228. The HSS is the master database for storing data for a given user. It is the entity containing the subscription-related information to support the network nodes actually handling communications (e.g. calls, sessions, etc) with a UE registered for said user. For example, the HSS provides support to the nodes implementing Call session functionalities in order to complete the routing/roaming procedures by solving authentication, authorization, naming/addressing resolution, location dependencies, etc. Further details of the functionality of the HSS are given in chapter 4.1.1.1 of 3GPP specification TS 23.002.

It is noted that, within the IMS, a user may have one of three different registration states. These are:

"Registered"—a contactable address is registered for the user; the user has an S-CSCF allocated that maintains the user profile which allows the user to initiate and terminate telecommunication services (such as making and receiving calls).

"Not Registered"—no contactable address information is held for the user by the IMS, nor is an S-CSCF allocated to the user. The user cannot initiate or terminate services from/to any terminal (UE) since no user terminal is currently registered for the user. Therefore, no services are available for the user. The user might, however, receive a terminating service (e.g. a terminating call) which can lead—according to existing IMS procedures—to an S-CSCF being allocated to the user to keep the user profile. This allows the execution of so-called "unregistered services" (e.g. diversion to a server of a terminating service, such as diversion of an incoming voice call to a voice mail server) via the allocated S-CSCF, and changes the user status to "Unregistered" (see below description of the "Unregistered" state).

"Unregistered"—no contactable address information is held for the user (e.g. there is no IP address of a UE registered for the user which is usable to contact the user). An S-CSCF is however allocated to the user and the S-CSCF maintains the user profile. So-called "unregistered services" are available to the user. These unregistered services allow a terminating service addressed to a user to be processed when the user has no UE terminal currently registered within the IMS which can be addressed from the IMS for the terminating service. Therefore, a user profile, held by the S-CSCF, can comprise information to process a terminating call addressing an identifier of the user in such a way that it is held (i.e. terminated) by a voice mail server.

In the event of a UE being powered off, or due to a loss of mobile network coverage, a user may be moved from a Registered to a Not Registered state. Thereafter, due, e.g. to some event such as a terminating service request, the user may be moved from the Not Registered state to the Unregistered state. To achieve this, the S-SSCF will obtain user profile data from the HSS. After some timeout period during which no further event occurs, the user will be moved back to the Unregistered state and the S-CSCF will delete the user's profile data.

Whilst the 3GPP organisation originally proposed the IMS in the context of mobile networks, it is noted that the IMS also finds application in respect of fixed access networks. A typical operator architecture may utilise the IMS to seamlessly deliver services over both a fixed and a mobile network.

The 3GPP organisation has standardized so-called "IMS Restoration Procedures" in the 3GPP specification TS 23.380 in order to specify how to handle a service interruption due to failures in the IMS core network. In particular, the specification considers the case where an S-CSCF assigned to serve a UE (after a registration of the UE) becomes unreachable, e.g. due to internal error, or looses user data, e.g. due to a restart. The restoration procedures envisaged by 3GPP allow the S-CSCF to store and retrieve registration user data such that, when a user registers successfully in the IMS network via a UE, the primarily assigned S-CSCF stores all the data needed to serve the user in the HSS. In the event of a failure of the primarily assigned S-CSCF, another (secondary) S-CSCF may retrieve the saved data and continue serving the users in a way that is transparent to the end users.

The proposed restoration procedures require both that the HSS itself, and the IP connectivity between the S-CSCF and the HSS, are continuously available. As such, there is a possibility that both temporary and permanent failures in the HSS and the interconnecting link will result in the restoration procedures failing to restore user services. To mitigate against this problem, the HSS is required not to trust user related information sent to it by S-CSCF if there is an inconsistency detected between the sent user data and the user data already stored in the HSS. The HSS, upon detecting such an inconsistency, must re-establish the old data into the S-CSCF (i.e. the so called "restoration information" which includes the old contact address, e.g. IP address, of the user corresponding to the old registration. However, this approach can result in inappropriate service delivery to the user. For example, when the user is Not Registered with the S-CSCF but is recorded as Registered in the HSS, re-registration of the user in the S-CSCF by the HSS may cause the S-CSCF to attempt to deliver a terminating service to an obsolete or even re-assigned "contact" address, rather than delivering an Unregistered service, e.g. voice mail.

SUMMARY

According to a first aspect of the present invention there is provided apparatus configured to operate as a Serving Call Session Control Function, S-CSCF, within an IP Multimedia Subsystem, IMS, core network. The apparatus comprises an interface for sending to a Home Subscriber Server, HSS, of the IMS core network, notifications indicating IMS registration state changes of users, and a detector for detecting delivery failure of a notification of an IMS registration state change sent to a HSS and relating to a given user. The apparatus further comprises a memory and memory controller for storing in said memory an association between an identifier of said given user and an indication of said delivery failure in order to indicate a loss of IMS registration state synchronisation for said given user between the S-CSCF and the HSS. There is further provided an event handler for detecting an event relating to said given user, the event requiring an IMS registration state change for the user, determining that said memory currently stores a delivery failure indication associated with the user's identifier, and causing said interface to send a further notification to the HSS, the further notification including both an indication of the required IMS registration state change and an indication of a previous loss of IMS registration state synchronisation for the user between the S-CSCF and the HSS.

Embodiments of the may prevent communication failures between the S-CSCF and the HSS resulting in a subsequent user service failures. In particular, the terminating services may be correctly handled on behalf of an Unregistered user.

The detector may be configured to detect failure of a notification indicating an IMS registration change, for said given user, from a Registered state to a Not Registered state, with said event handler being configured to detect an event requiring an IMS registration change, for said given user, from the Not Registered state to an Unregistered state. This event may comprise the receipt by the apparatus of a terminating service request in respect of said given user.

The interface may be further configured to receive, from the HSS, a response to the further notification, with the memory controller being responsive to said response to delete in said memory the delivery failure indication associated with an identifier of the user. The response may includes a user profile with the event handler being configured to use the user profile to progress the event.

According to a second aspect of the present invention there is provided apparatus configured to operate as a Home Subscriber Server, HSS, within an IP Multimedia Subsystem, IMS, core network. The apparatus comprises a memory for storing users' IMS registration states, and an interface for receiving from a Serving Call Session Control Function, S-CSCF, of the IMS core network, notifications indicating IMS registration state changes of users to new IMS registration states. The apparatus further comprises a state synchronisation handler for determining that a notification received from the S-CSCF contains an indication of a previous loss of IMS registration state synchronisation for a given user between the S-CSCF and the HSS, and for responding by updating the given user's IMS registration state in the memory to the new IMS registration state contained in the received notification.

The state synchronisation handler may be configured to determine a) that a notification indicates that the current IMS registration state for said given user is Unregistered, and b) that said memory currently records the user state as Registered, the state synchronisation handler being configured to update the memory to record the user's IMS registration state to Unregistered.

The state synchronisation handler may be configured, upon determining that a notification contains an indication of a previous loss of IMS registration state synchronisation, to cause said interface to send a response to the S-CSCF including a user profile.

According to a third aspect of the present invention there is provided a method of handling a communication failure between a Serving Call Session Control Function, S-CSCF, and a Home Subscriber Server, HSS, of an IP Multimedia Subsystem, IMS, network.

The method comprises, at the S-CSCF, detecting delivery failure of a notification sent by the S-CSCF to the HSS and relating to an IMS registration state change for a given user, and recording an indication of the delivery failure in association with said given user in order to indicate a loss of IMS registration state synchronisation for the given user between the S-CSCF and the HSS. The method further comprises detecting an event relating to said given user, the event requiring an IMS registration state change for the user to a new state, determining that a delivery failure indication is currently associated with the user, and sending a further notification to the HSS, the further notification including both an indication of the required IMS registration state change and an indication of a previous loss of IMS registration state synchronisation for the user between the S-CSCF and the HSS.

The method further comprises, at the HSS, receiving said further notification, determining that the notification includes said indication of a previous loss of IMS registration state synchronisation for the user, and updating an IMS registration state for the given user to said new IMS registration state included within the notification.

The step of detecting delivery failure may comprise detecting delivery failure of a notification indicating an IMS registration change, for said given user, from a Registered state to a Not Registered state. The step of causing said interface to send a further notification to the HSS is triggered by detection of an event requiring an IMS registration change, for said given user, from the Not Registered state to an Unregistered state. Said event may comprises the receipt by the S-CSCF of a terminating service request in respect of said given user.

Further aspects of the present invention are set out in the appended claims.

DETAILED DESCRIPTION

Figure 1:
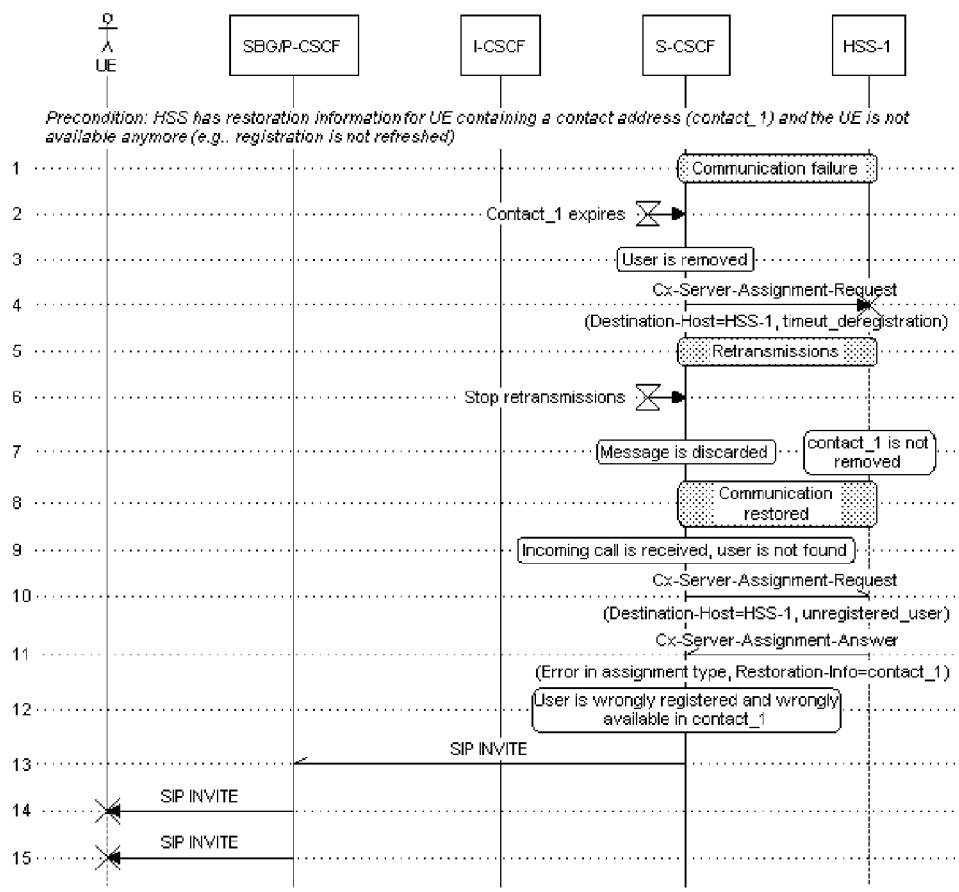
FIG. 1 illustrates a procedure within the IMS for handling IMS registration state, but which fails due to a temporary communication failure between the S-CSCF and the HSS.

Failure handling and recovery is critical when designing and implementing communication networks in order to both maximise operator revenue and enhance customer experience. With this in mind, the 3GPP organisation has specified a number of failure handling and recovery mechanisms for the IP Multimedia Subsystem (IMS).

3GPP TS 23.380 (section 4.3.2) describes a scenario where the HSS determines that the S-CSCF has lost its user data and, as a consequence, invokes restoration procedures. Consider the scenario illustrated in FIG. 1 and which assumes that a user has previously registered with the IMS using a contact IP address (e.g. contact_1). The scenario is associated with the following steps:

1. There is a temporary connection failure between the S-CSCF assigned to serve the user and the HSS (e.g. a problem has occurred in the IP backbone routing, a diameter link has gone down, or a hardware fault has occurred that causes the HSS to be temporarily out of service and not responding).

2-3. While the failure persists, the user's contactable address becomes unavailable. This might arise for example because the user has powered off the UE, or because the UE looses access network coverage (in the case of a mobile UE). The S-CSCF determines this change in user status and as a result de-registers the user from the S-CSCF (e.g. chapters 5.4.1.4.1 or 5.4.1.5 of 3GPP TS 24.229 disclose details of the data that the S-CSCF should delete in this situation).

4. The S-CSCF sends a message to inform the HSS of this event, asking the HSS to de-register the user and remove the restoration information (e.g. to disassociate the contactable address from the user identifier(s) served by the S-CSCF) stored in the HSS. Specifically, the S-CSCF sends to the HSS a Cx-Server-Assignment-Request (e.g. with TIMEOUT_DEREGISTRATION). Successful delivery of this message to the HSS would result in the HSS considering the user as "Not Registered". However, due to the noted failure, this message is not in fact delivered to the HSS.

5-7. After a certain time and/or number of unacknowledged resending attempts, the S-CSCF gives up its attempt to send the message (the timer to establish the TCP socket may be configurable). The HSS however still has the user status recorded as "Registered" and therefore contactable via the S-CSCF for any terminating service. The S-CSCF on the other hand has deleted the corresponding registration data, i.e. the S-CSCF does not have any registration data at all for the user, which means that the user is not found in its internal database.

8. Communication between the S-CSCF and the HSS is restored.

9. A terminating service, e.g. an incoming call, directed to the user is received. For example, the S-CSCF receives a SIP protocol INVITE message indicating an identifier (e.g. IMS Public User Identifier, IMPU, and or IMS Private User Identifier, IMPI) of the destination user.

10. The S-CSCF informs the HSS that the user is Not Registered and has received a call (e.g. by sending a Cx-SAR DIAMETER message comprising an "Unregistered_User" indication contained within the server assignment type AVP), in order to retrieve the user profile, move the user to an Unregistered state, and execute appropriate Unregistered services (e.g. forward the terminating service to a voice mail server).

11. The HSS detects an inconsistency. Specifically it detects that the data currently held by the HSS for the user records the user as Registered and currently assigned to that same S-CSCF, whist the message received from the S-CSCF indicates that the user is not currently registered within the S-CSCF (i.e. "Unregistered User"). Therefore, according to the currently standardized procedures in 3GPP TS 29.228 (e.g. section 6.1.2.1, and in particular page 19 first paragraph), the request of step 10 is rejected by the HSS. The HSS informs the S-CSCF of the rejection (Cx-SAA with diameter_"error_in_assignment_type"). Moreover, as a result of said standardized procedures, the HSS returns the currently registered contactable address (contact_1) to the S-CSCF (i.e. as a part of the so called "restoration information"), and the S-CSCF subsequently records the user with a registration state as "Registered" with the received contactable address (i.e. as stated by the "restoration information" received from the HSS).

12. The S-CSCF progresses the call towards the user. The call will be unsuccessful of course as the user is no longer present at the supposedly contactable address (e.g. contact_1). Whilst the called user will not be troubled directly by this failure—he or she has, for example, switched off the UE or lost network coverage—a problem will arise if contact_1 is now registered in respect of another user, i.e. the call is made to the wrong user. Even if contact_1 has not been reassigned to another user, the experience of the calling user will be poor as Unregistered services, e.g. voice mail, will not be executed on behalf of the called user as the S-CSCF has now wrongly recorded the user as Registered with "obsolete" information.

A similar problem can arise when the S-CSCF receives a new IMS registration request for a user, following an earlier failure to deliver a de-registration notification from the S-CSCF to the HSS. As the S-CSCF does not have any data for the user, it will send a message to the HSS indicating that this is an initial registration (i.e. there is no contact address associated with the user). The HSS will however determine that it does have a contactable address stored for the user (which is not valid, since it should have been deleted previously), and will inform the S-CSCF about this. The S-CSCF will then wrongly associate the invalid contact address provided by the HSS with the user.

It is proposed here to overcome this problem by first enabling the S-CSCF to indicate to the HSS the reliability of the information previously sent by the S-CSCF, when notifying the HSS of some new event. In other words, the S-CSCF will make the HSS aware that the information stored by the HSS for the user in question is not current, since the S-CSCF did not previously succeed in informing the HSS about a previous event.

According to this solution, an S-CSCF that fails to communicate a deregistration event of a user to the HSS will set a mark, indicating "pending to sync state with HSS", in respect of one or more user identifiers of the concerned user (e.g. the S-CSCF adds the user identifier into a "pending to sync state with HSS" list). When it is required to send a further communication message from the S-CSCF to the HSS in respect of the user (caused, for example, by the reception by the S-CSCF of a protocol message indicating a terminating service towards said user), the S-CSCF includes within the message a new indication depending on the existence of the mark. Subsequently, upon reception of the new indication from the S-CSCF, the HSS considers its own information about this user to be obsolete (i.e. it does not consider the S-CSCF communication as an error due to a restart on the S-CSCF) and replies to the S-CSCF by downloading to it the corresponding user profile. The HSS does not force the S-CSCF to restore obsolete data (i.e. the so-called "restoration information" including the old contact address). In addition, the HSS updates the status according to the S-CSCF indication (e.g. it replaces the status Registered with Unregistered and the associated obsolete data is removed). This will allow the S-CSCF to process a terminating service request for the user according to the Unregistered state service (e.g. diverting an incoming call to a voice mail server). The HSS status is then synchronized so that the user data is consistent again between S-CSCF and the HSS, i.e. both record the user as Unregistered.

Figure 2:
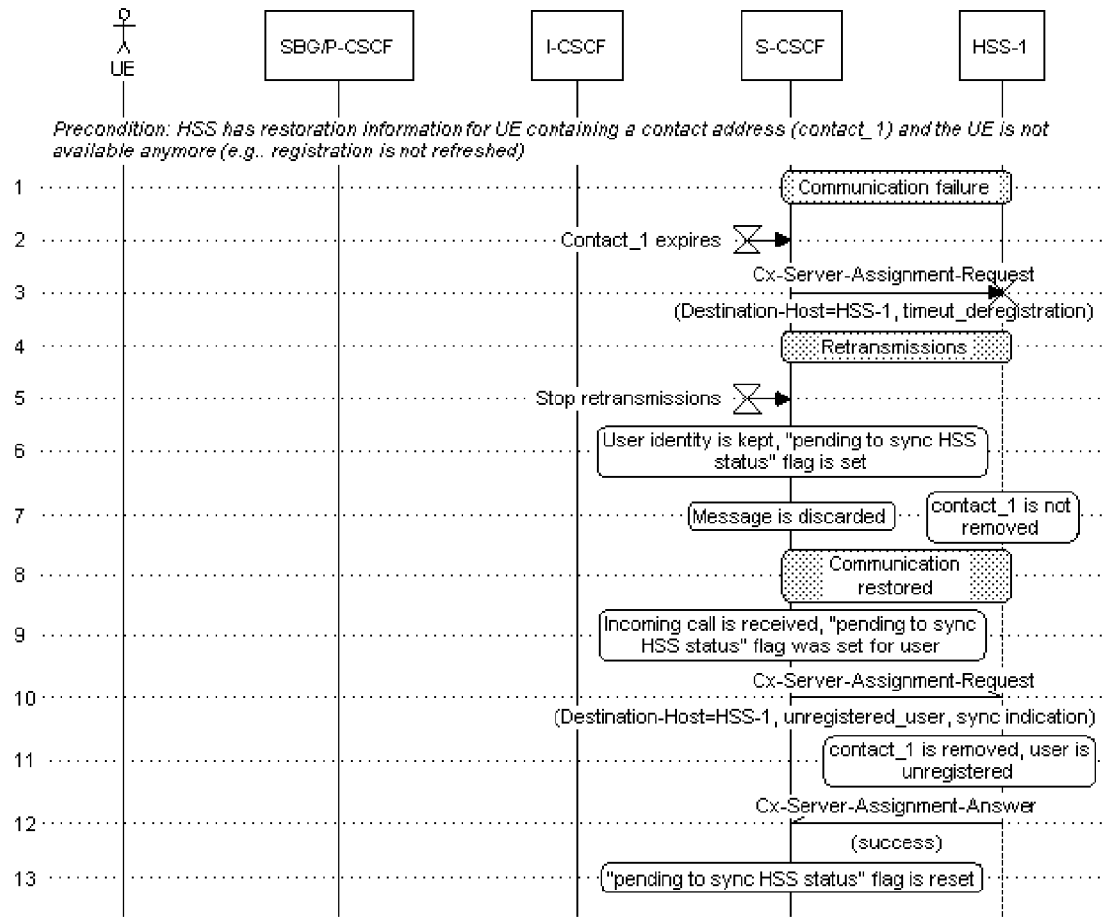
FIG. 2 illustrates an improved procedure within the IMS for handling IMS registration state and which is able to restore synchronisation lost due to a temporary communication failure between the S-CSCF and the HSS.

FIG. 2 illustrates this alternative scenario including the following steps:

1-5. These steps correspond to steps 1-6 of FIG. 1, except that step 3 of FIG. 1 is not performed, i.e. the user is not removed from the S-CSCF database.

6. The S-CSCF removes all data it has stored concerning the user (including data specific to the UE, such as its previously registered "contact" address). Alternatively, the data may be maintained but marked as obsolete. The user is now in a Not Registered state. However, according to the present solution, the S-CSCF stores one or more identifiers of the user (which can comprise identifier/s of the UE) in association with an indication of a delivery failure, thereby indicating a loss of IMS registration state synchronization for the user between the S-CSCF and the HSS. This can be achieved, for example, by causing the S-CSCF to add the user identifier(s) that was(were) registered through the UE to a "pending to sync state with HSS" list. The user identifier can comprise the IMPU of the user, the IMPI of the user, or the IMPU/IMPI pair (e.g. SIP-URI, TEL URI, etc).

7. This step corresponds to step 7 of FIG. 1. [NB. The S-CSCF now awaits any traffic activity associated with the user to inform the HSS of the inconsistency.]

8-9. After communication with the HSS has been restored, the S-CSCF receives a terminating service request. The S-CSCF determines, based upon the called user identifier, that this user is currently in a Not Registered state but detects that the user identifier is stored within the "pending to sync state with HSS" list.

10. As in step 10, FIG. 1, the S-CSCF then seeks to retrieve the user profile from the HSS to allow the S-CSCF to execute Unregistered services for the called user by sending a DIAMETER message "Server Assignment Request" (SAR) to the HSS. Again, the SAR message conveys a registration state indication indicating "Unregistered_User". However, the message also includes a new Attribute Value Pair (AVP) described in detail below. The new AVP informs the HSS of a previous failure to synchronize the registration state of this user between the S-CSCF and the HSS, so that any user state (e.g. registration state) and restoration information (e.g. the UE's contact address/es) that the HSS has currently stored in respect of this user is not up to date, since there was a previous, failed attempt (by the S-CSCF) to update the information in the HSS.

11. The HSS, conditioned by the content of the SAR message, updates the user state of this user to Unregistered and removes the previously registered contact address (restoration information).

12. The relevant user profile is returned from the HSS to the S-CSCF in a diameter Server-Assignment-Answer message to allow the further execution by the S-CSCF of the received terminating service (as well as the further execution of future terminating services received in respect to the user whilst still in "unregistered" state). The reply sent in this step 12 by the HSS is, therefore, not the same as the one sent in the corresponding step 11 of FIG. 1. In particular, and as a result of the HSS processing the state synchronization failure indication from the S-CSCF, the HSS determines that it should not re-establish "restoration information" in respect of this user. The reply sent from the HSS does not contain "restoration information" (i.e. it does not include the old "contactable address"), but rather contains the user profile data usable for allowing further execution by the S-CSCF of a terminating service.

13. Upon reception of successful response from HSS, the S-CSCF resets the "pending to sync HSS status" flag in respect to the identifier/s of this user, i.e. it removes the user identifier from the "pending to sync state with HSS" list.

Referring to step 10, the indication of a loss of user status synchronisation can be included in the SAR by means of a new and optional Boolean diameter AVP. The simple presence of the AVP within an SAR will trigger the new procedure in the HSS. The new AVP is referred to here as a "Resynchronization-Indication" AVP and has two possible values:

FALSE—This value indicates that the HSS registration information for the user identifier is to be trusted, i.e. there are no pending or failed requests from the S-CSCF to update the HSS. This is the default value when the AVP is absent.

TRUE—This value indicates that the HSS registration information for the identifier is not to be trusted, i.e. there are pending or failed requests from the S-CSCF to update the HSS. The HSS shall update its registration status and relevant information in accordance with the current Server-Assignment-Request command.

Figure 3:
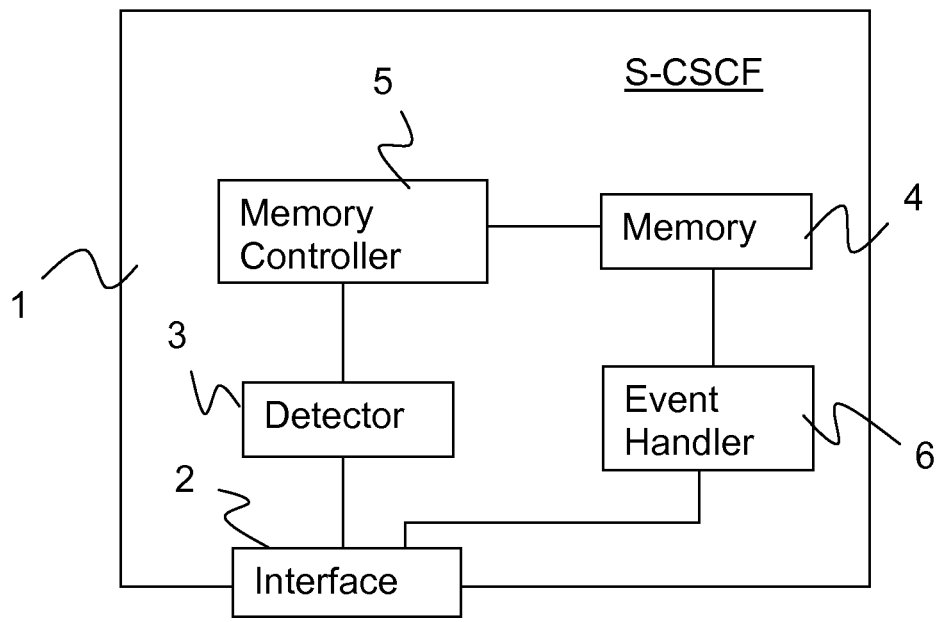
FIG. 3 illustrates schematically an S-CSCF configured to participate in the procedure of FIG. 2.

Referring now to FIG. 3, this illustrates schematically an apparatus 1 configured to operate as a Serving Call Session Control Function, S-CSCF, within an IP Multimedia Subsystem, IMS, core network. It will be appreciated that this apparatus may comprise a combination of processors, memories, etc, configured using appropriate software to implement certain of the functionality described above. More particularly, the apparatus comprises an interface 2 for sending to a Home Subscriber Server, HSS, of the IMS core network, notifications indicating IMS registration state changes of users. A detector 3 is provided for detecting delivery failure of a notification of an IMS registration state change sent to the HSS and relating to a given user.

A memory 4 and memory controller 5 are provided. The latter is arranged to store in the memory 4 an association between an identifier of the given user and an indication of the delivery failure. The memory therefore indicates, for this user and other affected users, a loss of IMS registration state synchronisation between the S-CSCF and the HSS. The apparatus further comprises an event handler 6 for detecting an event relating to the given user, where this event requires an IMS registration state change for the user. The event handler 6 is able to determine that the memory 4 currently stores a delivery failure indication associated with the user's identifier. Thereafter, it causes the interface 2 to send a further notification to the HSS, the further notification including both an indication of the required IMS registration state change and an indication of a previous loss of IMS registration state synchronisation for the user between the S-CSCF and the HSS.

Figure 4:
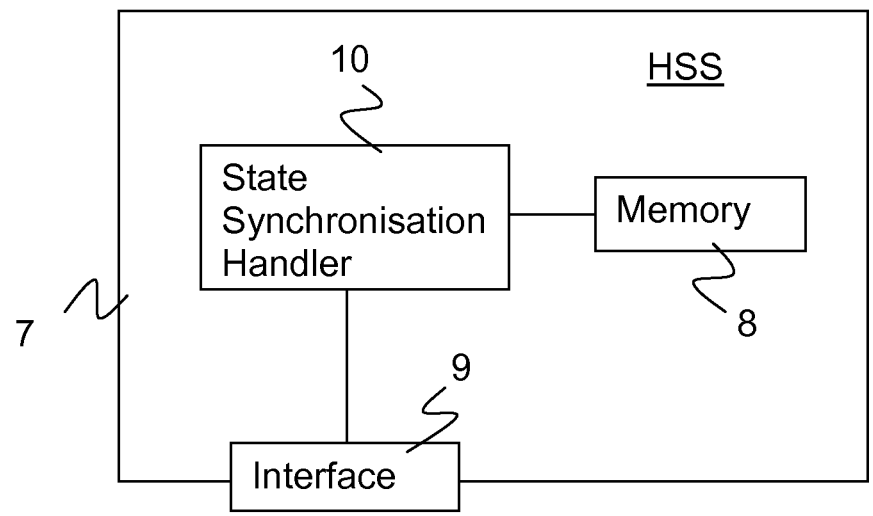
FIG. 4 illustrates schematically an HSS configured to participate in the procedure of FIG. 2.

FIG. 4 illustrates schematically apparatus 7 configured to operate as a Home Subscriber Server, HSS, within an IP Multimedia Subsystem, IMS, core network. Again, it will be appreciated that this apparatus may comprise a combination of processors, memories, etc, configured using appropriate software to implement certain of the functionality described above.

The apparatus (HSS) comprises a memory 8 for storing users' IMS registration states, as well as an interface 9 for receiving from a Serving Call Session Control Function, S-CSCF, of the IMS core network, notifications indicating IMS registration state changes of users to new IMS registration states. The apparatus further comprises a state synchronisation handler 10 for determining that a notification received from the S-CSCF contains an indication of a previous loss of IMS registration state synchronisation for a given user between the S-CSCF and the HSS. The state synchronisation handler 10 is configured to respond to such a determination by updating the given user's IMS registration state in the memory 8 to the new IMS registration state contained in the received notification.

Either or both the S-CSCF 1 illustrated in FIG. 3 and the HSS 7 illustrated in FIG. 4 can be implemented by apparatus having behaviour (e.g. comprising, among other things: the processing of signals received from other apparatus, the sending of signals to other apparatus and the content of sent signals, as well as the management of stored information according to—among other things—the content of signals received from other apparatus) controlled by one or more processors arranged to execute computer program instructions. In such implementations, each of the apparatus may comprise: a computer program instruction store (e.g. a memory incorporated by the apparatus), and a processor reading and executing the stored computer program instructions. Therefore, according to this implementation embodiment, the behaviour of some of the functional modules illustrated by FIG. 3 in respect to a S-CSCF (e.g. the interface 2, the detector 3, the memory controller 5, the event handler 6) or by FIG. 4 in respect to a HSS (e.g. the interface 9, the state synchronization handler 10) can be driven by computer program instructions that, when executed by processor/s within the S-CSCF or within the HSS, cause the S-CSCF or the HSS to behave according to any of the embodiments described herein.

Figure 5:
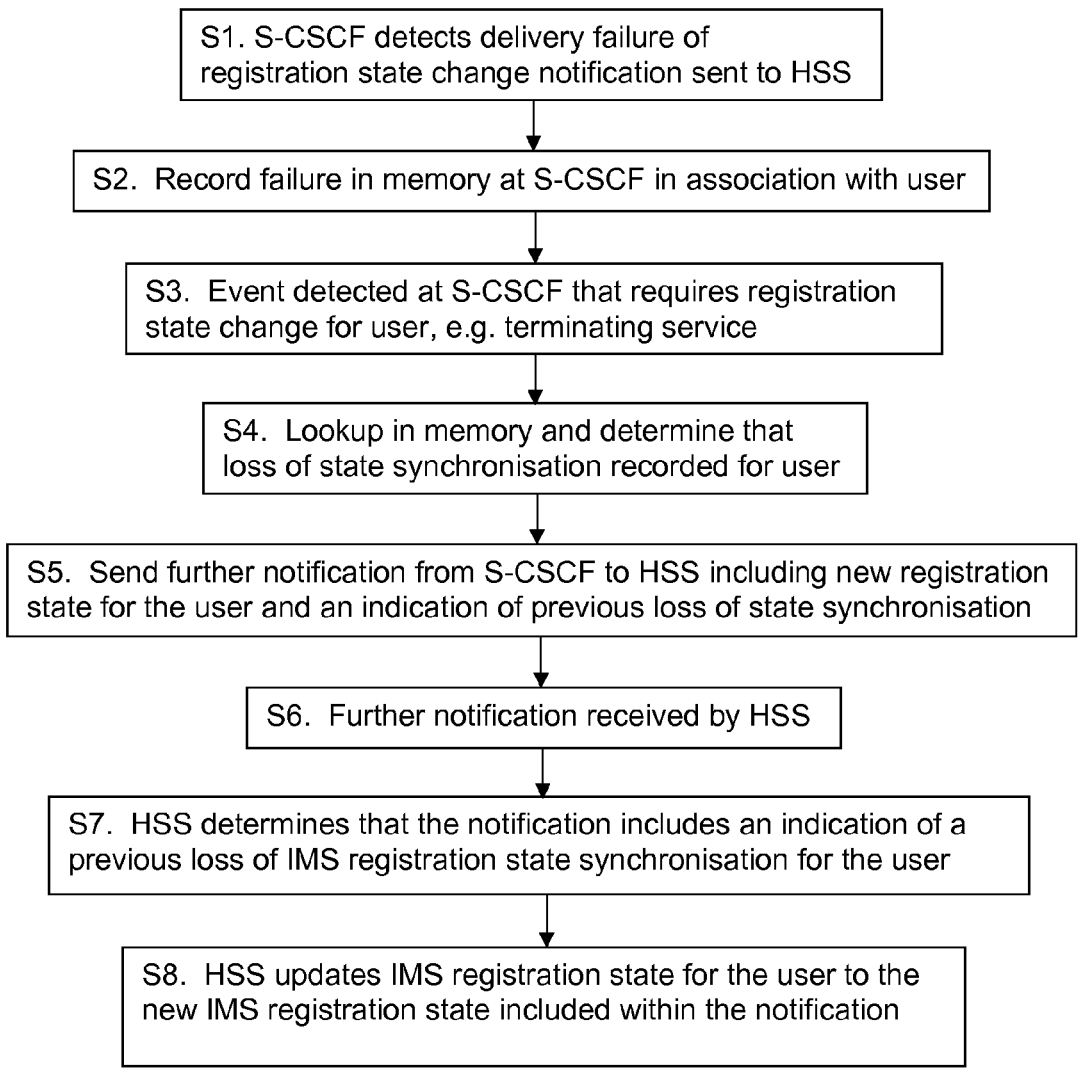
FIG. 5 is a flow diagram further illustrating the procedure of FIG. 2.

Referring now to FIG. 5, this is a flow diagram illustrating the method of handling a communication failure between a Serving Call Session Control Function, S-CSCF, and a Home Subscriber Server, HSS, of an IP Multimedia Subsystem, IMS, network. The S-CSCF firstly (51) detects delivery failure of a notification sent by the S-CSCF to the HSS and relating to an IMS registration state change for a given user. The delivery failure is then recorded (S2), at the S-CSCF, in association with the user in order to indicate a loss of IMS registration state synchronisation for the user between the S-CSCF and the HSS.

Subsequently, the S-CSCF detects (S3) an event relating to the same user, the event requiring an IMS registration state change for the user to a new state. The S-CSCF then determines (S4) that a delivery failure is currently associated with the user. In response (S5) the S-CSCF sends a further notification to the HSS, the further notification including both an indication of the required IMS registration state change and an indication of a previous loss of IMS registration state synchronisation for the user between the S-CSCF and the HSS.

This further notification is received at the HSS (S6), and the HSS determines (S7) that the notification includes the indication of a previous loss of IMS registration state synchronisation for the user. In response, the HSS updates (S8) an IMS registration state for the user to the new IMS registration state included within the notification.

It will be appreciated by the person of skill in the art that various modifications may be made to the above described embodiments without departing from the scope of the invention. By way of example, it is noted that the embodiment described above is concerned with a loss of user state synchronisation whereby the S-CSCF maintains a status of Not Registered and the HSS maintains a status of Registered. However, the invention may also be used to resolve other user state inconsistencies.

The invention claimed is:

1. A Serving Call Session Control Function, S-CSCF, apparatus for use within an IP Multimedia Subsystem, IMS, core network, the S-CSCF apparatus comprising:
   an interface for sending to a Home Subscriber Server, HSS, of the IMS core network, notifications indicating IMS registration state changes of users;
   a detector for detecting delivery failure of a notification of an IMS registration state change sent to a HSS and relating to a given user;
   a memory and memory controller for storing in said memory an association between an identifier of said given user and an indication of said delivery failure in order to indicate a loss of IMS registration state synchronization for said given user between the S-CSCF and the HSS; and
   an event handler for:
      detecting an event relating to said given user, the event requiring an IMS registration state change for the user;
      determining that said memory currently stores a delivery failure indication associated with the user's identifier; and
      causing said interface to send a further notification to the HSS, the further notification including both an indication of the required IMS registration state change and an indication of a previous loss of IMS registration state synchronization for the user between the S-CSCF and the HSS.

2. The apparatus of claim 1, wherein said detector is configured to detect failure of a notification indicating an IMS registration change, for said given user, from a Registered state to a Not Registered state, and said event handler is configured to detect an event requiring an IMS registration change, for said given user, from the Not Registered state to an Unregistered state.

3. The apparatus of claim 2, wherein said event comprises the receipt by the apparatus of a terminating service request in respect of said given user.

4. The apparatus of claim 1, wherein said event comprises the receipt by the apparatus of a terminating service request in respect of said given user.

5. The apparatus of claim 1, wherein said interface is configured to operate according to the Diameter protocol, and said notifications are conveyed within Server Assignment Request, SAR, messages.

6. The apparatus of claim 5, wherein said event handler is configured to include an indication of a previous loss of IMS registration state synchronization for the user as an Attribute Value Pair within an SAR message.

7. The apparatus of claim 1, wherein said interface is further configured to receive, from the HSS, a response to said further notification, and wherein said memory controller is responsive to said response to delete in said memory the delivery failure indication associated with an identifier of the user.

8. The apparatus of claim 7, wherein said response includes a user profile and said event handler is configured to use the user profile to progress the event.

9. A Home Subscriber Server, HSS, apparatus for use within an IP Multimedia Subsystem, IMS, core network, the HSS apparatus comprising:
  a memory for storing users' IMS registration states;
  an interface for receiving from a Serving Call Session Control Function, S-CSCF, of the IMS core network, notifications indicating IMS registration state changes of users to new IMS registration states; and
  a state synchronization handler for determining that a notification received from the S-CSCF contains an indication of a previous loss of IMS registration state synchronization for a given user between the S-CSCF and the HSS, and for responding by updating the given user's IMS registration state in the memory to the new IMS registration state contained in the received notification.

10. The apparatus of claim 9, wherein said state synchronization handler is configured to determine a) that a notification indicates that the current IMS registration state for said given user is Unregistered, and b) that said memory currently records the user state as Registered, the state synchronization handler being configured to update the memory to record the user's IMS registration state to Unregistered.

11. The apparatus of claim 9, wherein said interface is configured to operate according to the Diameter protocol, and said notifications are conveyed within Server Assignment Request, SAR, messages.

12. The apparatus of claim 11, wherein said state synchronization handler is configured to determine that a notification contains an indication of a previous loss of IMS registration state synchronization by detecting an Attribute Value Pair within an SAR message.

13. The apparatus of claim 9, wherein said state synchronization handler is configured, upon determining that a notification contains an indication of a previous loss of IMS registration state synchronization, to cause said interface to send a response to the S-CSCF including a user profile.

14. The apparatus of claim 10, wherein said state synchronization handler is configured, upon determining that a notification contains an indication of a previous loss of IMS registration state synchronization, to cause said interface to send a response to the S-CSCF including a user profile.

15. A method of handling a communication failure between a Serving Call Session Control Function, S-CSCF, and a Home Subscriber Server, HSS, of an IP Multimedia Subsystem, IMS, network, the method comprising:
  at the S-CSCF:
    detecting delivery failure of a notification sent by the S-CSCF to the HSS and relating to an IMS registration state change for a given user;
    recording an indication of the delivery failure in association with said given user in order to indicate a loss of IMS registration state synchronization for the given user between the S-CSCF and the HSS;
    detecting an event relating to said given user, the event requiring an IMS registration state change for the user to a new state;
    determining that a delivery failure indication is currently associated with the user; and
    sending a further notification to the HSS, the further notification including both an indication of the required IMS registration state change and an indication of a previous loss of IMS registration state synchronization for the user between the S-CSCF and the HSS; and
  at the HSS:
    receiving said further notification;
    determining that the notification includes said indication of a previous loss of IMS registration state synchronization for the user; and
    updating an IMS registration state for the given user to said new IMS registration state included within the notification.

16. The method of claim 15, wherein said step of detecting delivery failure comprises detecting delivery failure of a notification indicating an IMS registration change, for said given user, from a Registered state to a Not Registered state, and said step of causing said interface to send a further notification to the HSS is triggered by detection of an event requiring an IMS registration change, for said given user, from the Not Registered state to an Unregistered state.

17. The method of claim 15, wherein said event comprises the receipt by the S-CSCF of a terminating service request in respect of said given user.

18. A system comprising:
  a first apparatus configured to operate as a Serving Call Session Control Function, S-CSCF, within an IP Multimedia Subsystem, IMS, core network, the first apparatus comprising:
    an interface for sending to a Home Subscriber Server, HSS, of the IMS core network, notifications indicating IMS registration state changes of users;
    a detector for detecting delivery failure of a notification of an IMS registration state change sent to a HSS and relating to a given user;
    a memory and memory controller for storing in said memory an association between an identifier of said given user and an indication of said delivery failure in order to indicate a loss of IMS registration state synchronization for said given user between the S-CSCF and the HSS; and an event handler for:
: detecting an event relating to said given user, the event requiring an IMS registration state change for the user;
determining that said memory currently stores a delivery failure indication associated with the user's identifier; and
causing said interface to send a further notification to the HSS, the further notification including both an indication of the required IMS registration state change and an indication of a previous loss of IMS registration state synchronization for the user between the S-CSCF and the HSS; and a second apparatus configured to operate as a Home Subscriber Server, HSS, within an IP Multimedia Subsystem, IMS, core network, the second apparatus comprising:
: a memory for storing users' IMS registration states;
an interface for receiving from a Serving Call Session Control Function, S-CSCF, of the IMS core network, notifications indicating IMS registration state changes of users to new IMS registration states; and
a state synchronization handler for determining that a notification received from the S-CSCF contains an indication of a previous loss of IMS registration state synchronization for a given user between the S-CSCF and the HSS, and for responding by updating the given user's IMS registration state in the memory to the new IMS registration state contained in the received notification.

19. A non-transitory computer-readable storage medium storing computer program instructions which, when executed by a processor in a Serving Call Session Control Function, S-CSCF, cause the processor to perform a method of handling a communication failure between the S-CSCF and a Home Subscriber Server, HSS, of an IP Multimedia Subsystem, IMS, network, the method comprising:

detecting delivery failure of a notification sent by the S-CSCF to the HSS and relating to an IMS registration state change for a given user;
recording an indication of the delivery failure in association with said given user in order to indicate a loss of IMS registration state synchronization for the given user between the S-CSCF and the HSS;
detecting an event relating to said given user, the event requiring an IMS registration state change for the user to a new state;
determining that a delivery failure indication is currently associated with the user; and
sending a further notification to the HSS, the further notification including both an indication of the required IMS registration state change and an indication of a previous loss of IMS registration state synchronization for the user between the S-CSCF and the HSS.

20. A non-transitory computer-readable storage medium storing computer program instructions which, when executed by a processor in a Home Subscriber Server, HSS, cause the processor to perform a method of handling a communication failure between a Serving Call Session Control Function, S-CSCF, and the HSS of an IP Multimedia Subsystem, IMS, network, the method comprising:
receiving, from the S-CSCF, notifications indicating IMS registration state changes of users to new IMS registration states;
determining that a notification received from the S-CSCF contains an indication of a previous loss of IMS registration state synchronization for a given user between the S-CSCF and the HSS; and
updating the given user's IMS registration state in the memory to the new IMS registration state contained in the received notification.

\* \* \* \* \*